(12) United States Patent
Krichevsky et al.

(10) Patent No.: US 7,974,339 B2
(45) Date of Patent: Jul. 5, 2011

(54) OPTIMIZED DATA TRANSMISSION SYSTEM AND METHOD

(76) Inventors: Alex Krichevsky, Laguna Beach, CA (US); Constance Nash, Laguna Beach, CA (US)

( * ) Notice: Subject to any disclaimer, the term of this patent is extended or adjusted under 35 U.S.C. 154(b) by 1401 days.

(21) Appl. No.: 10/892,690

(22) Filed: Jul. 16, 2004

(65) Prior Publication Data

US 2004/0258150 A1    Dec. 23, 2004

Related U.S. Application Data

(63) Continuation of application No. PCT/US02/00503, filed on Jan. 16, 2002.

(51) Int. Cl.
*H04N 7/12* (2006.01)
(52) U.S. Cl. .................................. 375/240.01
(58) Field of Classification Search ............. 375/240.01, 375/240.15, 240.23; 380/54; 382/239, 236; 348/699
See application file for complete search history.

(56) References Cited

U.S. PATENT DOCUMENTS

| | | | | |
|---|---|---|---|---|
| 4,776,013 A | * | 10/1988 | Kafri et al. | ........................ 380/54 |
| 4,785,349 A | * | 11/1988 | Keith et al. | .............. 375/240.23 |
| 5,778,092 A | | 7/1998 | MacLeod et al. | |
| 5,784,175 A | | 7/1998 | Lee | |
| 5,838,333 A | * | 11/1998 | Matsuo | .......................... 345/604 |
| 5,878,169 A | * | 3/1999 | Miyamoto | ..................... 382/236 |
| 6,014,181 A | * | 1/2000 | Sun | ................. 348/699 |
| 6,078,307 A | * | 6/2000 | Daly | ............................. 345/600 |
| 6,198,467 B1 | * | 3/2001 | Chiang | ......................... 345/698 |
| 6,326,981 B1 | * | 12/2001 | Mori et al. | ..................... 345/695 |
| 6,473,062 B1 | * | 10/2002 | Debiez et al. | ................... 345/63 |
| 6,608,632 B2 | * | 8/2003 | Daly et al. | ..................... 345/698 |
| 7,050,639 B1 | * | 5/2006 | Barnes et al. | ................. 382/239 |
| 7,551,189 B2 | * | 6/2009 | Hunter | ........................... 345/698 |

FOREIGN PATENT DOCUMENTS

| | | |
|---|---|---|
| EP | 0 712 088 A2 | 5/1996 |
| EP | 1 006 715 A2 | 6/2000 |
| EP | 1 006 717 A2 | 6/2000 |

OTHER PUBLICATIONS

Supplementary European Search Report, dated Sep. 23, 2005.
Strobach, Tree Structured Scene Adaptive Coder, IEEE Transactions on Communications, Apr. 1990, vol. 38, No. 4, pp. 477-486.

\* cited by examiner

*Primary Examiner* — Tung Vo

(57) ABSTRACT

A system for transmitting data is provided. The system includes a frame analysis system receiving frame data, such as a frame of video data, and generating region data, such as a uniform matrix size that is used to divide the frame into a predetermined set of matrices. A pixel selection system receives the region data and generates one set of pixel data for each region, such as by selecting one of the pixels contained within each of the original matrices that comprise the frame.

13 Claims, 4 Drawing Sheets

OPTIMIZED DATA TRANSMISSION SYSTEM AND METHOD

FIELD OF THE INVENTION

The present invention pertains to the field of data transmission, and more particularly to a system and method for optimizing data transmission that decreases bandwidth requirements for data transmission.

BACKGROUND OF THE INVENTION

Data transmission systems are known in the art. Such data transmission systems often use compression to decrease bandwidth requirements. For example, compression techniques have been characterized as "lossless" when no reduction in data occurs, or "lossy" when a loss of data occurs that does not adversely affect the intended use.

One drawback with such data transmission systems is that the compressed data must be "decompressed" on the receiving end. Thus, for lossless data compression systems, the exact configuration of the data must be achieved when the data is decompressed. Likewise, even for lossy data compression systems, the data is decompressed and the lost data is then approximated. The need for such decompression contributes to the overall difficulty in implementing data transmission in conjunction with compression.

SUMMARY OF THE INVENTION

In accordance with the present invention, a system and method for transmitting data are provided that overcome known problems with data transmission systems and methods.

In particular, a system and method for data transmission are provided that use data optimization instead of compression, so as to provide a mixed lossless and lossy data transmission technique.

In accordance with an exemplary embodiment of the present invention, a system for transmitting data is provided. The system includes a frame analysis system receiving frame data, such as a frame of video data, audio data, graphical data, text data, or other suitable data, and generating region data, such as a uniform matrix size that is used to divide the frame into a predetermined set of matrices. A pixel selection system receives the region data and generates one set of pixel data for each region, such as by selecting one of the pixels contained within each of the original matrices that comprise the frame. For data that is used for purposes other than the generation of a display, the pixel data can instead be audio data, text data, or other suitable data.

The present invention provides many important technical advantages. One important technical advantage of the present invention is a system and method for transmitting data that do not require the data to be compressed at the sending end and decompressed at the receiving end. The present invention uses data optimization to transmit only the data that is necessary for the application, such that decompression of the data on the receiving end is not required. In this manner, the present invention incorporates features of both lossless and lossy compression without requiring the data to be decompressed on the receiving end.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
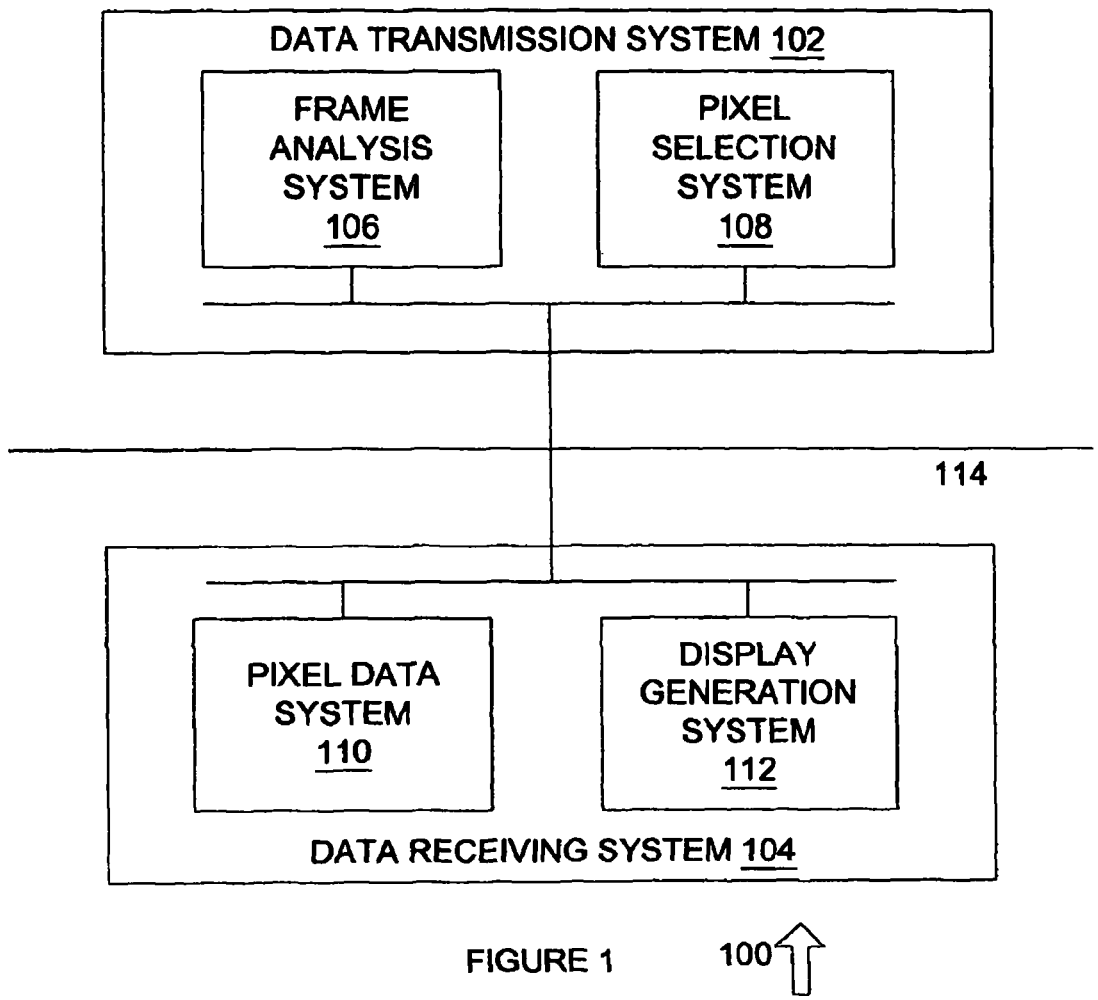
FIG. 1 is a diagram of a system for transmitting data in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a system 100 for transmitting data in accordance with an exemplary embodiment of the present invention. System 100 allows data such as video data to be transmitted in a manner that does not require the data to be compressed, and which results in significant decreases in bandwidth requirements for data transmission.

System 100 includes data transmission system 102, which is coupled to data receiving system 104 over a suitable communications medium 114. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. In one exemplary embodiment, systems and components are coupled to other systems and components through intervening systems and components, such as through an operating system of a general purpose computing platform. Communications medium 114 can be the Internet, the public switched telephone network, a wireless network, a local area network, an optical network, other suitable communications media, or a suitable combination of such communications media.

Data transmission system 102 includes frame analysis system 106 and pixel selection system 108, each of which can be implemented in hardware, software, or a suitable combination of hardware and software, and which can be one or more software systems operating on a general purpose processing platform. As used herein, a software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of software in a specific purpose software application.

Data transmission system 102 reduces data transmission requirements by eliminating data that is not required for the application of the data on the receiving end. In one exemplary embodiment, data transmission system 102 can receive frames of video data, and can select pixels of data for transmission that are needed in order to allow the frames of video data to be viewed by the human eye. In this exemplary embodiment, a video display having a quiescent state of pixels in either the "on" or "off" states can be used to generate video data by selecting a subset of pixels within the frame to display image data. In this exemplary embodiment, if a frame of video data has low detail, it may only be necessary to provide a data value for one of every twenty-five pixels or less in order to create the image to be viewed by the human eye. Likewise, if the frame of video data has a large amount of detail, it may be necessary to transmit each pixel in order to generate a suitable image. When a frame of video data includes regions of high detail and low detail, it may likewise be desirable to transmit only the necessary number of pixels in each region that are required to generate the image. In this exemplary embodiment, the number of pixels to transmit can be decided on a region-by-region basis within the frame.

Data receiving system 104 includes pixel data system 110 and display generation system 112, each of which can be implemented in hardware, software, or a suitable combination of hardware and software, and which can be one or more software systems operating on a general purpose processor platform. Data receiving system 104 receives the data from data transmission system 102, and generates a display for a user that utilizes the optimized data set transmitted by data transmission system 102. In one exemplary embodiment, data receiving system 104 can generate a video display, such as by illuminating predetermined pixels within a frame based on the determination of the level of detail required for the frame, and by leaving the remaining pixels in a quiescent state of either "off" or "on." Likewise, data receiving system 104 can generate frames of video data that have variable levels of detail, to accommodate the image data being transmitted.

Frame analysis system 106 receives frame data including pixel data and generates matrix size data based upon the pixel data. In one exemplary embodiment, frame analysis system 106 can analyze adjacent pixel data values in the frame, and can apply one or more predetermined variation tolerances to select a matrix size for a data optimization region. In this exemplary embodiment, the matrix size for each data optimization region of a frame can be uniform, such that each data optimization matrix has the same dimensions. Thus, if a 640× 480 pixel frame is being transmitted, then the 640×480 pixel frame can be split up into a 64×48 frame of matrices, where each matrix is a 10×10 matrix. Likewise, frame analysis system 106 can assign a different matrix size on a frame by frame basis, such as where a first frame is transmitted using 10×10 matrices for a 64×48 matrix frame, and a subsequent frame could then be transmitted using 5×5 data matrices, for a 128×96 matrix frame. In another exemplary embodiment, the size of matrices within the frame can be varied, such that a given frame is made up of matrices varying in size, such as from a 1×1 matrix to a 5×5 matrix or greater. In yet another exemplary embodiment, the size of the matrices can be non-symmetrical, such that an N×M matrix can be used where N and M are integer values that are not equivalent. Likewise, other suitable data optimization regions can be selected, such as ones that are not based on a matrix structure, but which may be circular, elliptical, amorphous, or based on other suitable structures.

Pixel selection system 108 selects one or more pixel within a predefined matrix or other region for transmission in an optimized data transmission system. In one exemplary embodiment, pixel selection system 108 can randomly select a pixel from a location within a matrix or other region, can use a sequence selection scheme such that the pixel is selected in accordance with a predetermined sequence, or other suitable selection criteria can be used. Pixel selection system 108 can further generate pixel location data within the matrix, such that the pixel can be regenerated at a predetermined location, at a random location, or in other suitable manners. For example, if a predetermined location is used, the predetermined location can be the same for each matrix or other region, such as by assigning a quadrant or other location (e.g., the first row and column position in the matrix). Likewise, if randomization is used, control data can be generated that will cause data receiving system 104 to randomize the location of each pixel in each matrix or other region without requiring individual control data for each matrix or other region. Likewise, other suitable pixel selection data can be generated.

Pixel data system 110 receives matrix data and pixel data and assembles frame data based on the matrix data and pixel data. In one exemplary embodiment, pixel data system 110 receives a matrix size identifier for an entire frame, such that it can be determined that a uniform matrix size is used for each frame. Likewise, pixel data system 110 can receive matrix map data, such that a sequence of matrices and the size of each matrix can be determined. Likewise, pixel data system 110 can receive pixel data for each matrix, such as pixel data with each matrix identifier, pixel data in a predetermined order based on the order of matrix data transmitted, or other suitable data.

Display generation system 112 receives frames of data from pixel data system 110 and generates video data, audio data, graphical data, textual data, or other suitable data for use by a user. In one exemplary embodiment, display generation system 112 receives an entire frame of data after it has been reconstructed by pixel data system 110. In another exemplary embodiment, display generation system 112 can receive frame data as it is generated by pixel data system 110 prior to the generation of the entire frame. Other suitable configurations can be used.

In operation, system 100 allows data transmission to be optimized so as to decrease bandwidth requirements. System 100 determines the optimal data for transmission based on the end use of the data. For example, system 100 can reduce the data transmitted for video display generation, such as by determining the level of detail required, and then transmitting data based on the level of detail required. Likewise, similar optimization processes can be used for audio data, graphical data, textual data, or other suitable data. Thus, system 100 is a lossy data transmission system, but can also be a lossless data transmission system depending on the data fields within a set of data for which lossy or lossless data transmission is desired. In this exemplary embodiment, system 100 allows data sets to be processed in a manner that allows data transmission to be both lossless and lossy based on application criteria for the data on the receiving end.

System 100 can also be used in conjunction with a compression system, a frame elimination system, or with other suitable systems or processes to achieve further savings in bandwidth requirements. For example, after data optimization has been achieved, the optimized data can then be compressed using a lossy or lossless compression technique. Likewise, frame elimination can be used where such techniques do not result in an unacceptable decrease in the quality of the data at the receiving end.

Figure 2:
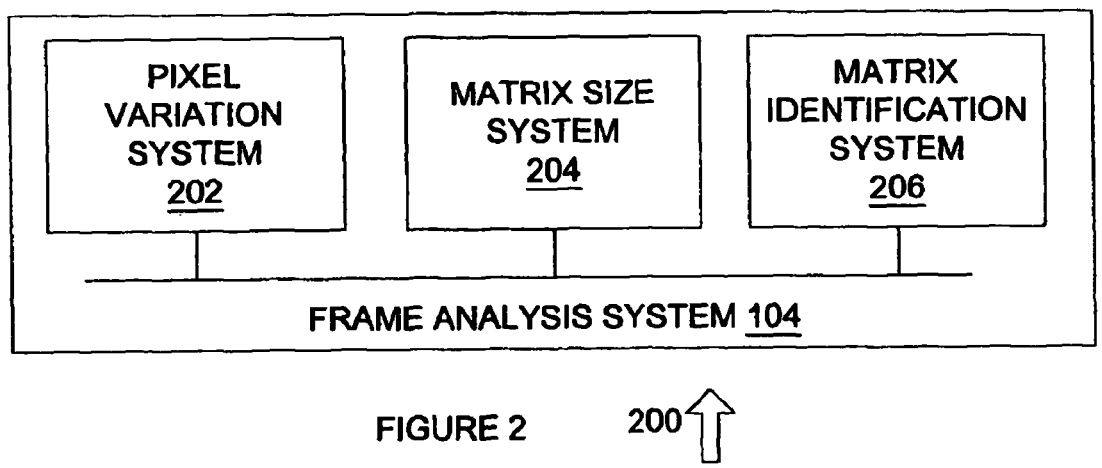
FIG. 2 is a diagram of a system for performing frame analysis in accordance with an exemplary embodiment of the present invention.

FIG. 2 is a diagram of a system 200 for performing frame analysis in accordance with an exemplary embodiment of the present invention. System 200 includes frame analysis system 106 and pixel variation system 202, matrix size system 204, and matrix identification system 206, each of which can be implemented in hardware, software, or a suitable combination of hardware and software, and which can be one or more software systems operating on a general purpose processing platform.

Pixel variation system 202 determines the level of detail required based on variations in pixel data. In one exemplary embodiment, pixel variation system 202 can receive pixel data values, such as (x/y/z) in a suitable pixel color data system (e.g., 16-bit values for R/G/B, Y/Cb/Cr, Y/U/V, or other suitable color data formats). Pixel variation system 202 can then compare two adjacent pixels to determine whether the amount of variation between those two adjacent pixels exceeds a predetermined tolerance, such that the amount of pixel data required to transmit image data or other suitable data for perception by a human eye or other suitable applications can be determined. In this exemplary embodiment, pixel variation system 202 can have a number of tolerance settings, so that a matrix size, region, or other data optimization set can be determined. For example, consider the following pixel set:

P1(121/34/187) P2(119/39/198) P3(117/42/202)

In this example, the variation between P1 and P2 may be lower than a first tolerance for the purposes of selecting a first data set, such as a 2×2 matrix, but the variation between P1 and P3 may be greater than a second tolerance for the purpose of selecting a second data set, such as a 3×3 matrix. In this manner, increasing groups of pixels can be analyzed so as to insure that desired levels of detail are not inadvertently omitted. For example, if video data includes an image of an essentially uniform object, such as the ocean or a grassy field, and where that essentially uniform object has details that are nonetheless of interest to the viewer, such as wave whitecaps or wildflowers, pixel variation system 202 can include tolerance settings such that variations between pixels that identify such details would be identified, but where such variations between two adjacent pixels within the field would be ignored. Likewise, other suitable pixel variation detection functionality can be provided.

Matrix size system 204 generates matrix size data based on pixel variation data. In one exemplary embodiment, matrix size system 204 can receive pixel variation data based on an analysis of an entire frame of data, such that a uniform matrix size can be assigned. Likewise, matrix size system 204 can receive pixel variation data from pixel variation system 202, and can generate nonsymmetrical matrix dimensional data, such as N×M dimensions where "N" and "M" are integers that are not equivalent, circular region data, elliptical region data, amorphous region data, or other suitable region identification data. Matrix size system 204 can also generate matrix size control data, such as where a non-uniform matrix or region size is used within a frame. In this exemplary embodiment, matrix size system 204 can identify a sequence for matrices, coordinate data for matrices, size data for matrices, or other suitable data that can be used to assemble or sequence pixel data within matrices.

Matrix identification system 206 receives matrix size data and generates matrix identification data. In one exemplary embodiment, matrix identification system 206 can receive matrix sequence data, and can assemble the matrix sequence data for use with pixel data generated by pixel selection system 108. In this exemplary embodiment, matrix identification system 206 can identify whether a uniform matrix size is being generated, the number of matrices within a frame, sequence data for the matrices when a non-uniform matrix or region is being used, or other suitable data. Matrix identification system 206 generates matrix identification data for use by data receiving system 104, so as to allow data receiving system 104 to generate the optimized data display.

In operation, system 200 allows frames to be analyzed so as to determine the optimal data to be transmitted, based on the intended use of the frame. In one exemplary embodiment, pixel variation system 202 or other suitable systems can be used to identify lossy and lossless regions within the frame. Likewise, uniform lossy regions can be identified, such as matrices having predetermined dimensions of greater than 1×1 or other suitable data.

Figure 3:
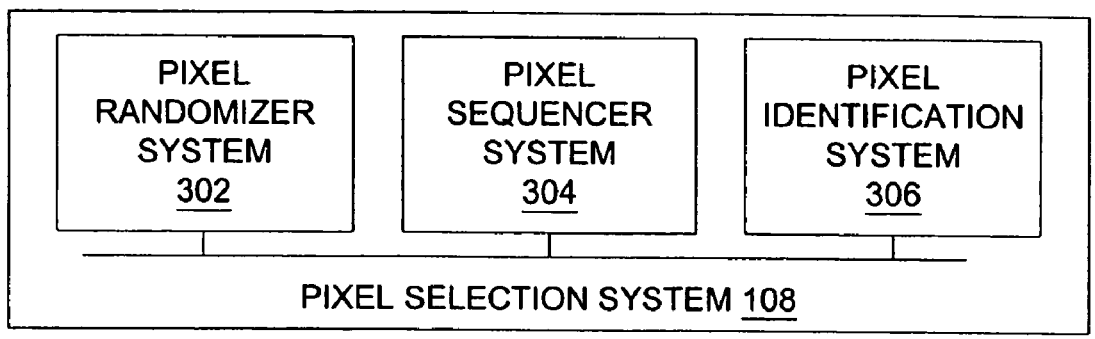
FIG. 3 is a diagram of a system for selecting optimized pixel data for transmission in accordance with an exemplary embodiment of the present invention.

FIG. 3 is a diagram of a system 300 for selecting optimized pixel data for transmission in accordance with an exemplary embodiment of the present invention. System 300 includes pixel selection system 108 and pixel randomizer system 302, pixel sequencer system 304, and pixel identification system 306, each of which can be implemented in hardware, software, or a suitable combination of hardware and software, and which can be one or more software systems operating on a general purpose processor platform.

Pixel randomizer system 302 selects a random pixel within a matrix or other region. In one exemplary embodiment, pixel randomizer system 302 can generate a random number and can select a pixel based upon a pixel sequence and the relationship of the generated random number to that pixel sequence. In this exemplary embodiment, pixel randomizer system 302 can generate a random number between 0 and 1, and can multiply that random number times the number of pixels within a region, and can then select the pixel based upon a pixel sequence from a predetermined location. Likewise, other suitable random pixel selection processes can be used. Pixel randomizer system 302 generates random pixel location data and random pixel value data.

Pixel sequencer system 304 generates pixel selection data based on pixel sequence data. In one exemplary embodiment, such as when a uniform frame matrix size is being used, pixel sequencer system 304 can select pixels in a predetermined order, such that if a 3×3 matrix is used uniformly across the frame, the pixel at location (1,1) is transmitted in the first frame, the pixel at location (1,2) is transmitted in the second frame, the pixel at location (1,3) is transmitted in the third frame, and so forth, until the pixel at location (3,3) has been transmitted, after which the pixel at location (1,1) will be transmitted. Pixel sequencer system 304 can likewise send other suitable sequences, such as skipping every other pixel, skipping pixels based on predetermined display generation characteristics, or other suitable sequences.

Pixel identification system 306 generates pixel identification data, such as may be required by a data receiving system to illuminate the pixel in a display. In one exemplary embodiment, pixel identification system 306 can identify the coordinates of a pixel where generation of the pixel by the data receiving system at the exact location is desired. Likewise, pixel identification system 306 can identify a uniform pixel location within each matrix or other region, such as location (1,1) for all matrices, such as randomizer control data that will randomly place a pixel within a matrix or region, or other suitable pixel identification data.

In operation, system 300 allows a pixel within a matrix or other suitable region to be selected based on data optimization. System 300 allows random, sequenced, or other suitable processes to be used to select and locate pixels within optimized regions.

Figure 4:
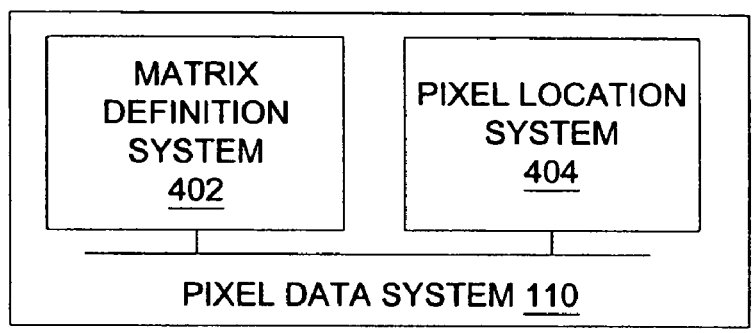
FIG. 4 is a diagram of a system for generating a frame in accordance with an exemplary embodiment of the present invention.

FIG. 4 is a diagram of a system 400 for generating a frame in accordance with an exemplary embodiment of the present invention. System 400 includes pixel data system 110, matrix definition system 402 and pixel location system 404, each of which can be implemented in hardware, software, or a suitable combination of hardware and software, and which can be one or more software systems operating on a general purpose processor platform.

Matrix definition system 402 receives matrix definition data for use in generating frame data. In one exemplary embodiment, matrix definition data can include data that identifies a uniform matrix size throughout the frame. In another exemplary embodiment, matrix definition data can include data that identifies matrix dimensions and sequences, so that a sequence of non-similar matrices can be assembled into a frame. Likewise, matrix definition system 402 can include region definition data, such as for ellipses, circles, amorphous shapes, or other suitable definition data.

Pixel location system 404 receives pixel location data for locating a pixel within a matrix or other region. In one exemplary embodiment, pixel location system 404 can receive data that locates pixels for each matrix within a frame on a uniform basis, such that each pixel received will be generated in a predetermined location (e.g. (1,1) in a 3×3 matrix). Likewise, pixel location system 404 can receive randomization data, such that the location of a pixel within a matrix or other region is randomly assigned. In yet another exemplary embodiment, pixel location system 404 can receive exact coordinates for placement of pixels. Other suitable processes can be implemented by pixel location system 404.

In operation, system 400 is used to locate pixels of data within a matrix or other region in an optimized data transmission system. System 400 thus allows optimized data, such as video data, audio data, or other suitable data, to be used to generate a display, an audio stream, graphic images, textual data, and other suitable data on a frame by frame basis.

Figure 5:
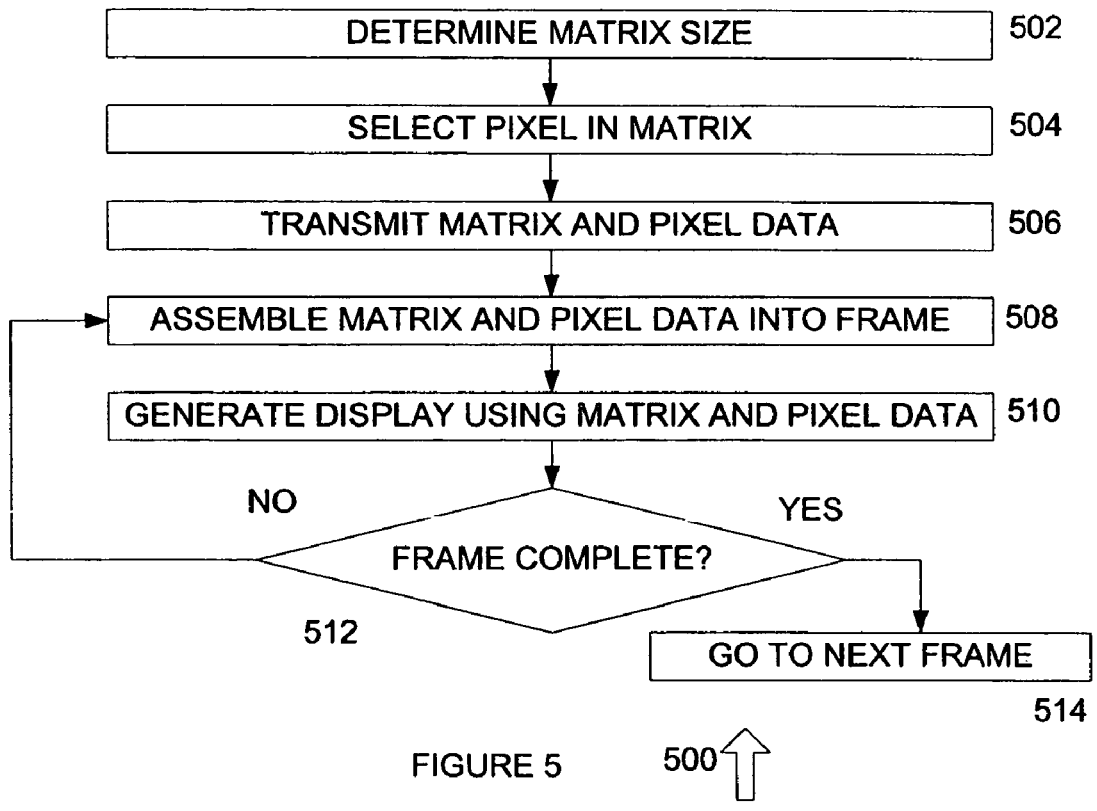
FIG. 5 is a flow chart of a method for optimizing data transmission in accordance with an exemplary embodiment of the present invention.

FIG. 5 is a flow chart of a method 500 for optimizing data transmission in accordance with an exemplary embodiment of the present invention. Method 500 begins at 502 where a matrix size is determined. In one exemplary embodiment, the matrix size can be uniformly assigned across the frame, a matrix size can assigned based upon regions within the frame, a region other than a matrix can be used, or other suitable matrix sizes or region sizes can be determined. The method then proceeds to 504.

At 504 a pixel within the matrix is selected. In one exemplary embodiment, the pixel can be selected based on a predetermined location within the matrix, such as when uniform matrix sizes are used within a frame, or in other suitable manners. In another exemplary embodiment, pixel selection can be performed based on random selection, based upon predetermined rules regarding selection of pixels, or in other suitable manners. The method then proceeds to 506.

At 506 the matrix and pixel data is transmitted. In one exemplary embodiment, the matrix and pixel data can be transmitted in pairs, such that each set of matrix definition data or location data is paired with corresponding pixel brightness data. Likewise, matrix data and pixel data can be transmitted in sequence, such that the sequence of matrix data is received first, and the sequence of pixel data for each corresponding matrix is then received. Other suitable transmission sequences can likewise be used. The method then proceeds to 508.

At 508 the matrix and pixel data is assembled into a frame. In one exemplary embodiment, the frame assembly can be performed on a line-by-line basis, such that each line of data can be generated as it is created. In another exemplary embodiment, an entire frame of data can be generated prior to utilization of the frame of data. The method then proceeds to 510.

At 510 a display is generated using the matrix and pixel data. As previously described, the display can be generated from an entire frame data set after it has been completed. Likewise, the display can be generated on a line-by-line basis, audio streams or graphical displays can be generated, or other suitable displays can be generated. The method then proceeds to 512.

At 512 it is determined whether a frame is completed. If the frame is not completed the method returns to 508. Otherwise the frame is complete, the method proceeds to 514 and the method proceeds to the next frame.

Figure 6:
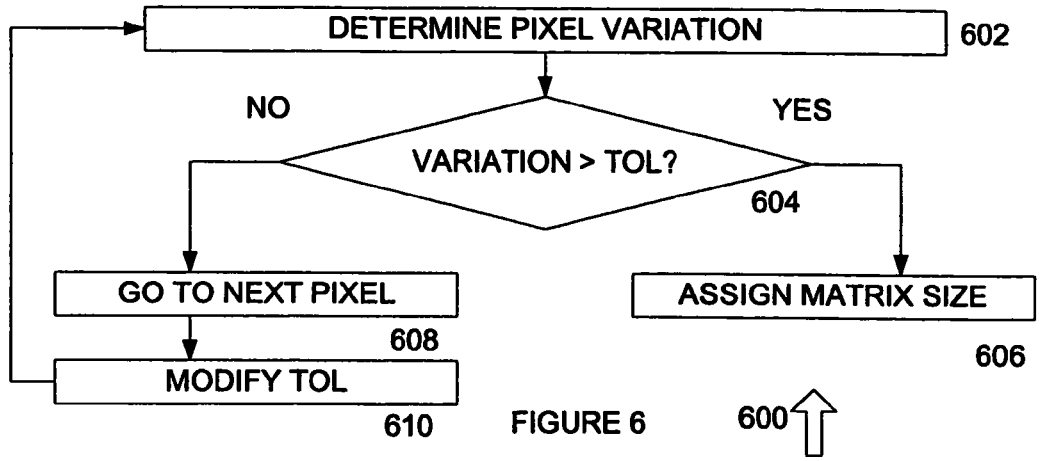
FIG. 6 is a flowchart of a method for determining or assigning matrix or region size based on an exemplary embodiment of the present invention.

FIG. 6 is a flowchart of a method 600 for determining or assigning matrix or region size based on an exemplary embodiment of the present invention. Method 600 begins at 602 where a pixel variation is determined. In one exemplary embodiment, the pixel data values for two adjacent pixels can be compared, and it can be determined whether the variations between the two adjacent pixel data values exceed predetermined allowable variations. The suitable variation techniques can be implemented. The method then proceeds to 604.

At 604 it is determined whether the variation is greater than a predetermined tolerance. If it is determined at 604 that the variation is greater than the tolerance the method proceeds to 606 where the matrix size is assigned based on the number of pixels under consideration. In one exemplary embodiment, if a first and second pixel have been compared and it is determined that the variation between pixels exceeds the tolerance, then a matrix size of 1×1 (i.e., an individual pixel), can be transmitted such that data transmission is lossless. If it is determined that the variation is not greater than the tolerance, the method proceeds to 608.

At 608, the next pixel is selected. In one exemplary embodiment, the next pixel can be selected based upon an N×N matrix size, an N×M matrix size, a circular region size, an elliptical region size, an amorphous region size, or other suitable regions. The method then proceeds to 610.

At 610 the tolerance is modified. In one exemplary embodiment, the tolerance can be modified with each increasing region size, such that smaller tolerances are imposed for larger regions. Likewise, a maximum region size can be imposed such that the tolerance is set to zero. Likewise, if it is determined at 604 that the maximum region size has been reached, the method can proceed directly to 606. After the tolerance is modified at 610, the method returns to 602.

In operation, method 600 allows a matrix or other suitable region size to be determined based upon pixel variations. In one exemplary embodiment, pixel variation can be determined at 602 on a frame basis, such that a first tolerance is set for having uniform matrices of 2×2 size, a second tolerance is set for having uniform matrices of a 3×3 size, and other suitable tolerances can be used. Likewise, tolerances can be set and regions can be determined based on a region-by-region basis, such that in areas having low information consent, the matrix size is increased whereas in areas having high information content the matrix size is decreased. In one exemplary embodiment, the matrix size can be decreased to 1×1, such that in areas having high information content, the data transmission can be lossless, but in areas having low information content, the data transmission can be lossy.

Figure 7:
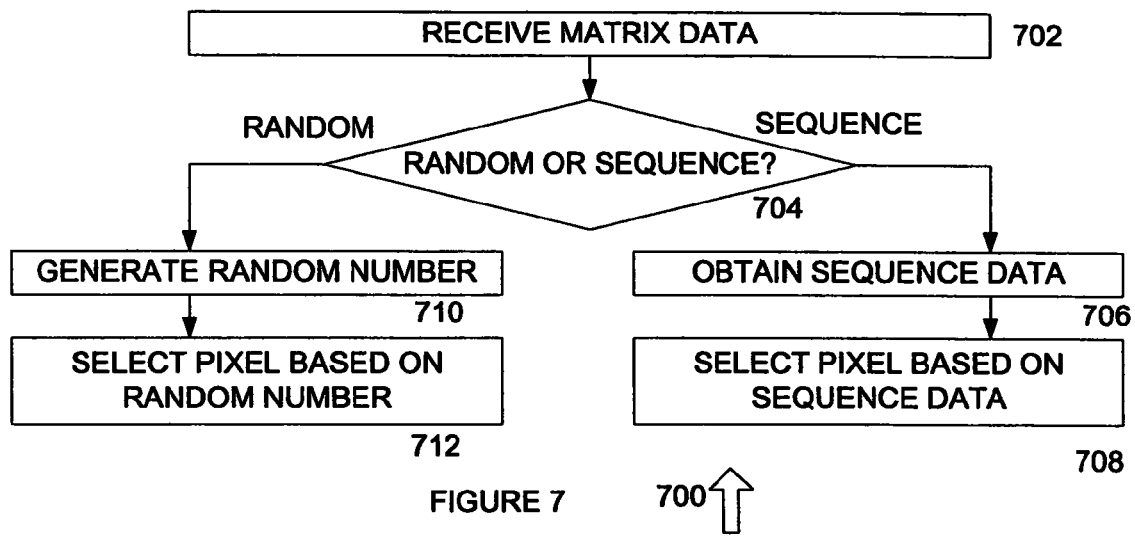
FIG. 7 is a flowchart of a method for selecting a pixel within a region in accordance with an exemplary embodiment of the present invention.

FIG. 7 is a flowchart of a method 700 for selecting a pixel within a region in accordance with an exemplary embodiment of the present invention. Method 700 begins at 702 where matrix or other region data is received. In one exemplary embodiment, the matrix data can include a matrix size, a region size, a region boundary for amorphous regions, or other suitable data. The method then proceeds to 704.

At 704, it is determined whether random or sequencing selection is being used for selecting the pixel data. If it is determined that sequencing data is used, the method proceeds to 706 where the sequence data is obtained. In one exemplary embodiment, such as where a uniform matrix size is used within the frame, a sequence of pixels can be used such that the pixels are "swept" across the matrix. Likewise, other suitable sequence data can be used. After the sequence is obtained at 706 the method proceeds to 708 where a pixel is selected based on the sequence data. The pixel data for the matrix is then stored.

Likewise, if it is determined at 704 that a random pixel selection is being used, the method proceeds to 710 where a random number is generated. The method then proceeds to 712.

At 712 a pixel is selected based on a random number. In one exemplary embodiment, a random number generated between 0 and 1 can be multiplied by the number of pixels within the matrix or region, and a predetermined sequence can be used to select the pixel. Likewise, the pixel data values can be randomly identified or other suitable random selection processes can be used.

In operation, method 700 allows pixel data within a matrix or other region to be selected, which are based on sequencing, random selection, or in other suitable manners. Method 700 allows pixel data for optimized data applications to be used, such as where video data having low information content and regions of high information content are being transmitted or in other suitable applications.

Figure 8:
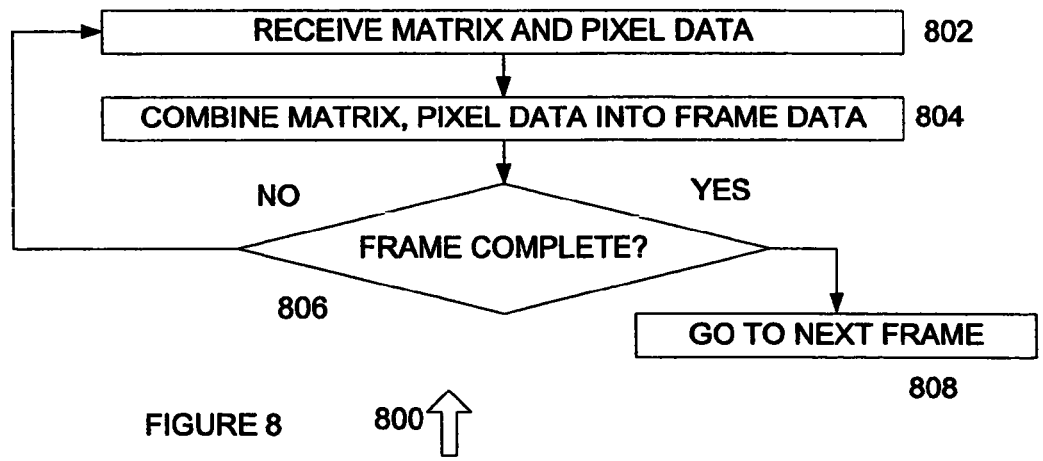
FIG. 8 is a flowchart for method for generating optimized frame data in accordance with an exemplary embodiment of the present invention.

FIG. 8 is a flowchart of a method 800 for generating optimized frame data in accordance with an exemplary embodiment of the present invention. Method 800 begins at 802 where matrix and pixel data are received. In one exemplary embodiment, the matrix and pixel data can include a standard or uniform matrix size and a sequence of pixels for the frame. In another exemplary embodiment, the matrix and pixel data can include a sequence of matrix sizes that define a frame and a sequence of pixels for generation within each matrix. In yet another exemplary embodiment, the matrix and pixel data can be region and pixel data, such as where the region data defines one or more regions within a frame and the pixel data includes points that go within that region. Other suitable data can also be used, such as audio data, graphical data, text data, or other suitable data. The method then proceeds to 802.

At 802 the matrix and pixel data are combined into a frame. In one exemplary embodiment, the frame can be generated on a line-by-line basis, such that the matrices are assembled in rows and that the pixel for each matrix are assigned after a row is complete. In this exemplary embodiment, such as where matrix sizes exceed 2×2, then assembling a row of matrices can result in the assembly or two or more lines of data, such as where video data is generated by scanning lines from the top of a display to the bottom of a display. In this exemplary embodiment, the frame can be generated as each line is completed. The method then proceeds to 804.

At 804 it is determined whether the frame has been completed. In one exemplary embodiment, an entire frame of data can be constituted prior to generation of the frame. Likewise, in another exemplary embodiment, the data can be generated on a line-by-line basis, so that the data does not need to be buffered until a complete frame is generated. Other suitable processes can also be used. If it is determined at 804 that the frame is not complete, the method returns to 800. Otherwise, the method proceeds to 804 and advances to the next frame.

In operation, method 800 allows frames of data, such as video data, audio data, graphical data, textual data, or other suitable data, to be generated in an optimized manner, such that lossy, lossless, or a combination of lossy and lossless data transmission is used based upon the end use of the data. In this exemplary embodiment, uniform or non-uniform matrices or regions can be used, such that only one of two or more points of data within a data set for each region needs to be transmitted.

Figure 9:
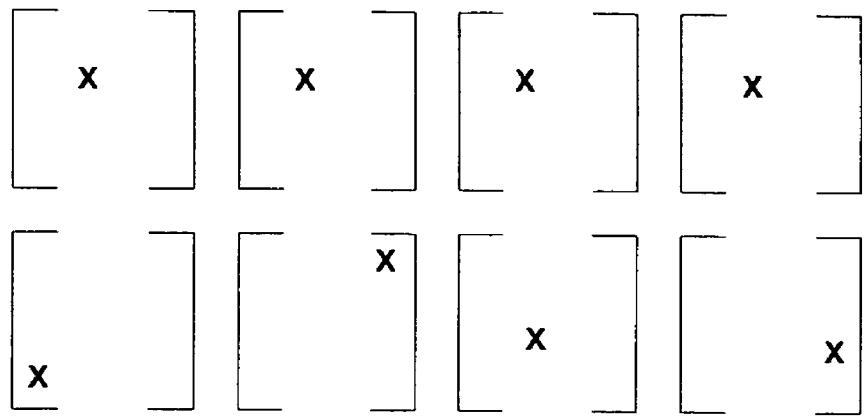
FIG. 9 is a diagram 900 showing an exemplary uniform matrix segmentation of an array of pixel data.

FIG. 9 is a diagram 900 showing an exemplary uniform matrix segmentation of an array of pixel data. Each matrix of the array is of uniform size, such as 4×4. Thus, the matrix size data for the entire frame can be represented by a single data set.

In the first row of matrices, the location "X" of a single pixel of data is identical (e.g. (2,2)), such as where the location of the pixel in each matrix is based on sequential data. In the second row, the location of the pixel in each matrix is different, such as where the location of the pixel in each matrix is random. In this exemplary embodiment, the matrix data can include the single uniform size (e.g. 4×4), the pixel location data can include the location of the pixel in each matrix (e.g. (2,2), "random," or the coordinates of each pixel starting with the first matrix and sweeping across from left to right until the last matrix in the last row is reached (e.g. (4,1) (1,4), (3,2), (3,4)) and the pixel data for each matrix can include the (X/Y/Z) data, such as where the pixel is a color pixel. Likewise, other suitable data can be used.

Figure 10:
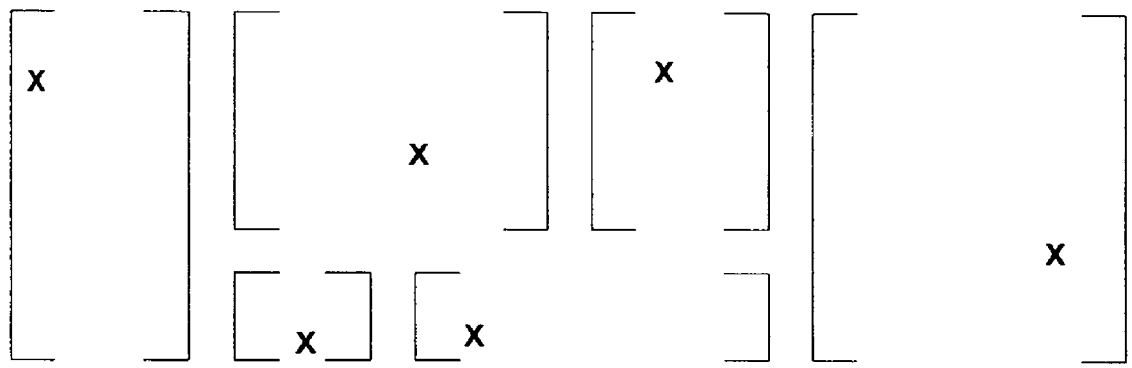
FIG. 10 is a diagram 1000 showing an exemplary non-uniform matrix segmentation of an array of pixel data.

FIG. 10 is a diagram 1000 showing an exemplary non-uniform matrix segmentation of an array of pixel data. Each matrix of the array can be of different size, but the matrices must form the array when combined. In each matrix, the location of the pixel in each matrix is different, such as where the location of the pixel in each matrix is random. In this exemplary embodiment, the matrix data can include the size of each matrix in series, starting from the first matrix and sweeping across from left to right until the last matrix is reached (e.g. (7×3), (5×6), (5×4), (7×7), (2×3), (2×7)), the pixel location data can include the location of the pixel in each matrix (e.g. (2,2), "random," or the coordinates of each pixel starting with the first matrix and sweeping across from left to right until the last matrix in the last row is reached (e.g. (2,1), (4,4), (2,2), (5,6), (2,2), (2,2)), and the pixel data for each matrix can include the (X/Y/Z) data, such as where the pixel is a color pixel. Likewise, other suitable data can be used.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A system for transmitting data transmission comprising:
   a analysis system receiving frame data and generating region data comprised of high detail and or low detail;
   a pixel selection system receiving the region data and generating one set of pixel data for each region forming a new set of data for transmission;

a data receiving system receiving the region data and the pixel data for each region and generating a display;

wherein the data receiving system comprises a pixel data system receiving matrix definition data and pixel data and generating pixel location data;

wherein the data receiving system comprises a display generation system receiving pixel location data and generating display data that includes the pixel data placed according to the location data.

2. The system of claim 1 wherein the frame analysis system comprises a matrix size system receiving pixel variation data and generating matrix size data.

3. The system of claim 1 wherein the frame analysis system comprises a matrix identification system receiving matrix size data and generating matrix identification data.

4. The system of claim 1 wherein the pixel selection system comprises a pixel Randomizer system receiving two or more sets of pixel data for each region and randomly selecting one of the two or more sets of pixel data.

5. The system of claim 1 wherein the pixel selection system comprises a pixel sequencer system receiving two or more sets of pixel data for each region and selecting one of the two or more sets of pixel data based on sequence data.

6. The system of claim 1 wherein the pixel selection system comprises a pixel identification system generating pixel location data based on a location of the set of pixel data associated with each of the regions.

7. A method for transmitting data comprising:
receiving frame data;
generating optimized matrix data from the frame data;
selecting one of two or more sets of pixel data based on the optimized matrix data;
wherein receiving frame data comprises receiving an array of pixel data;
wherein generating the optimized matrix data from the frame data comprises setting a matrix size based on pixel selection data;
and transmitting the selection pixel data and the optimized matrix data by assembling the optimized matrix data and the selection pixel data into a generated display frame.

8. The method of claim 7 wherein selecting one of two or more sets of pixel data comprises selecting the pixel from a matrix of sets of pixel data.

9. The method of claim 7 wherein transmitting the pixel data and the matrix data comprises transmitting an array of pixel data and uniform matrix size data.

10. A method for transmitting data comprising:
dividing an array of pixel data into two or more regions;
selecting a set of pixel data from each region;
wherein dividing the array of pixel data comprises dividing the array of pixel data into two or more matrices having a uniform size;
wherein dividing the array of pixel data comprises dividing the array of pixel data into two or more matrices having two or more different sizes;
and transmitting the region data and the selection pixel data for each region by assembling the region data and the selection pixel data into a generated display frame.

11. The method of claim 10 wherein selecting the set of pixel data from each region comprises selecting a random set of pixel data.

12. The method of claim 10 wherein transmitting the region data and the pixel data for each region comprises transmitting matrix data and the pixel data for each matrix.

13. The system of claim 1 wherein the frame analysis system comprises a pixel variation system receiving two or more sets of pixel data and generating the region data based on pixel variation data from the two or more sets of pixel data.

* * * * *